United States Patent [19]
Siems et al.

[11] 4,072,923
[45] Feb. 7, 1978

[54] MULTICHANNEL SEISMIC TELEMETER SYSTEM AND ARRAY FORMER

[75] Inventors: Lee E. Siems; Paul M. Morgan, both of Houston, Tex.

[73] Assignee: Western Geophysical Co. of America, Houston, Tex.

[21] Appl. No.: 664,617

[22] Filed: Mar. 8, 1976

[51] Int. Cl.² ............................................. G01V 1/22
[52] U.S. Cl. .................... 340/15.5 TS; 340/15.5 DP; 340/152 T; 340/183; 179/15 AL; 179/15 BL
[58] Field of Search ................ 340/15.5 DP, 15.5 TS, 340/151, 152 T, 183; 179/15 BL, 15 A, 15 AL

[56] References Cited

U.S. PATENT DOCUMENTS

| | | | |
|---|---|---|---|
| 3,052,875 | 9/1962 | Heberling | 179/15 A |
| 3,748,638 | 7/1973 | Montgomery, Jr. et al. | 340/15.5 TS |
| 3,879,582 | 4/1975 | White et al. | 179/15 AL |
| 3,881,166 | 4/1975 | Fort et al. | 340/15.5 TS |
| 3,911,226 | 10/1975 | Angelle et al. | 340/15.5 TS |
| 3,930,145 | 12/1975 | Fort et al. | 340/15.5 TS |
| 3,986,162 | 10/1976 | Cholez et al. | 179/15 AL |
| 3,990,036 | 11/1976 | Savit | 340/15.5 TS |

Primary Examiner—Howard A. Birmiel
Attorney, Agent, or Firm—William A. Knox

[57] ABSTRACT

It is a purpose of this invention to dispose a large number, such as 500, of elemental seismic sensor units over the earth's surface in a desired pattern. The sensors are arranged preferably in a linear pattern, at increasing distances, remotely with respect to a central station. Each elemental seismic sensor unit comprises a short subarray consisting of three seismic detectors, electrically interconnected. Each elemental sensor unit is a separate source of seismic signals. At regular intervals the analog seismic signals from the elemental sensor units are sampled in sequence and are digitized as a 20-bit binary number. The binary numbers are representative of the analog signal levels. The binary numbers are encoded in a self-clocking, return-to-zero pulse code as digital data words. The data words from the respective elemental sensor units are time-delay multiplexed into a wide band transmission channel for transmission to the central station in a constant current mode. Spaced along the transmission link are a series of transceiver units to each of which several separate sensor units are connected. The transceiver units are connected in series and include a repeater network which receives and retransmits data words from down-link transceivers, as well as data words derived from each of the locally-connected sensor units. Each repeater network also includes a word detection circuit, a local clock, and synchronizing circuitry. In the central station, the respective data words are stored as a matrix, in a core memory in sequential order. A formatter extracts from the core memory, data words that originated from selected groups of the elemental subarrays. The data words are combined to form new composite data words representative of seismic signals originating from desired longer arrays. The composite data words are transferred to a recording medium, such as a magnetic tape, for storage or future use.

4 Claims, 6 Drawing Figures

MULTICHANNEL SEISMIC TELEMETER SYSTEM AND ARRAY FORMER

REFERENCE TO RELATED APPLICATIONS

This application forms part of a group of patent applications filed concurrently having the following Serial Number, title and inventor(s):

SEISMIC METHOD AND SYSTEM OF IMPROVED RESOLUTION AND DISCRIMINATION-Carl H. Savit. Ser. No. 665,150.

A MULTIPLEXER COMMUTATED HIGH PASS FILTER-Lee E. Siems. Ser. No. 664,614 now U.S. Pat. No. 4,031,506.

GAIN RANGING AMPLIFIER SYSTEM-George Mioduski. Ser. No. 664,616 now U.S. Pat. No. 4,031,504.

SEISMIC DATA TELEMETERING SYSTEM-Lee E. Siems, Paul M. Morgan. Ser. No. 665,151 now U.S. Pat. No. 4,023,140.

DECENTRALIZED SEISMIC DATA PROCESSING SYSTEM-Lee E. Siems et al. Ser. No. 664,618.

MULTIPLEXER OFFSET REMOVAL CIRCUIT-Lee E. Siems. Ser. No. 664,615, now U.S. Pat. No. 4,005,273.

BACKGROUND OF THE INVENTION

1. Field of the Invention

This invention relates to seismic exploration systems including telemetering circuits for transmitting seismic data to a central station and for processing the seismic data.

2. Description of the Prior Art

Seismic exploration is conducted over land and water bodies. In either case, acoustic signals are injected into the earth and the reflected seismic signals are detected by a large number of seismic detectors arranged into detector arrays. For example, in marine work the detector arrays are housed in a streamer cable which typically is 10,000 feet long and which may contain 50 such arrays. Each array forms a single channel. Each channel is coupled to a seismic recording system through a separate pair of wires. Different detector arrays are required for different geologic formations, for shallow or deep penetration work, and in general, different arrays are required for satisfying the different demands of geophysicists.

For deep penetration, employing low seismic frequencies, detector arrays consist of 25 to 35 detectors distributed over 200–300 feet. Depending upon the desired response characteristics, the detectors may be spatially tapered within the confines of the array or the detector outputs may be electrically weighted.

In exploring shallow earth formations, relatively high-frequency seismic energy is of interest. For this application, the required arrays are very short, 25 to 50 feet or less. As few as 10 detectors may be used in such arrays.

In general, when seismic crews require different arrays for different applications, it is necessary to physically interchange the cables containing the different arrays. It would be desirable to have one single cable containing up to 500 short subarrays, which can be electrically reconfigured so as to become equivalent to any type of larger array required for a particular geologic condition. In a conventional system, if each subarray constitutes a single channel, 500 pairs of wires would be required. While a cable formed of 50 pairs of wires is manageable by a seismic crew, a cable formed of say 500 wire pairs for 500 channels would be nearly impossible to accomodate in field use.

Physical limitations involving the weight of the cable and other difficulties have therefore limited the number of channels which have been used in seismic systems up to the present time despite the advantages which could theoretically occur from obtaining information from additional channels. The possibility of transmitting seismic signals representing 500 channels, to a central processing point presents numerous other problems. For example, the cost of the required data processing which would be very high using conventional general purpose data processing equipment, despite recent substantial cost reductions.

The matter of transmitting 500 signals to a central point could not practically be accomplished by using 500 separate pairs of wires, as noted above. Another possibility would be to provide 500 separate seismic data processing stations and multiplex the data over a lesser number of channels, so that 500 pairs of wires would not be needed. However, the provision of 500 individual, active data processing stations would be prohibitively expensive. Further, normal carrier type multiplexing would require very high-frequency, tuned circuits and associated electronics which normally is so sensitive and requires so much maintainance, as to be impractical for seismic field use. The direct transmission of digital signals also presents many problems, due to various signal degradation factors. In this connection it may be noted that the electrical integrating characteristics of extended cables severely degrade conventional bi-level digital signals.

Because of the large number of significant electrical, mechanical, data processing, weight, and cost problems as outlined above, up to the present time it has been considered to be impossible or impractical to construct usable, commercial seismic systems in which seismic signals from several hundred sensor units are separately brought back to a central station and recorded.

SUMMARY OF THE INVENTION

In accordance with the present invention, a number of transceiver units are disposed remotely with respect to a central station. The transceiver units are connected to the central station by a wide-band data transmission link and an interrogation link. Each unit includes several input channels to each of which is connected a short seismic sensor subarray consisting of three sensors separated by about 6½ feet. A channel selector sequentially connects the input channels to a common signal-conditioning and digitizing network including an output channel. The output channel applies digital data signals from the seismic subarrays to the transmission link for multiplexed transmission to the central station. In the central station, digital data words, representing seismic signals from the subarrays are weighted and composited by a formatter into new data words representative of a seismic signal that would have been obtained from a desired, much larger seismic sensor array.

In an important aspect of this invention, the digitized seismic signals are formatted into a self-clocking, phase-encoded, return-to-zero pulse code for transmission through the wide-band transmission link, in order to reduce signal degradation as more fully described herein.

In accordance with further aspects of the invention, the data processing logic in each of the various transceivers includes a local clock. The local clocks operate asynchronously with respect to each other although at substantially identical frequencies.

Each transceiver unit either transmits local data into the wide band transmission link or it receives data words from the respective down-link transceiver units. Data words received from down-link transceiver units are resynchronized to the local clock, regenerated, and retransmitted to the next up-link transceiver unit for eventual final transmission to the central station.

For identification, the data words are separated by a short "dead space" of no-data. Furthermore, to identify the beginning of a data word, following a dead space, the first bit of each data word following a dead space, in a preferred embodiment, is characterized by a positive-going leading edge. The end of a data word is sensed when no pulse polarity-reversal occurs within any two bit intervals.

In another aspect of this invention, self-clocking data words are transmitted in constant-current mode.

In yet a further aspect of this invention, the central station includes a core memory and means are provided to store the digital data words from the elemental seismic sensor units in a memory matrix in channel-sequential order. The central station also includes a formatter which extracts from memory, data words originating from selected seismic sensor subarrays, and combines these signals as new composite data words representative of desired larger arrays.

In accordance with another aspect of this invention, the central station includes a coefficient read only memory (ROM) for applying desired weighting coefficients to the data words from individual subarrays before they are combined as a composite data word.

In the central station, a means is provided to measure the time interval between application of an interrogation pulse over the interrogation link, and the arrival of the respective data words from the transceiver units. The time interval is converted to an address code which is stored in an address memory to identify incoming data words as to their source in terms of the transceiver unit number and the channel number within each transceiver.

A controller in the central station transmits interrogation pulses to the transceiver units over an interrogation link. In response to the interrogation pulses, the electronics network in the respective transceiver units samples the analog signal present at an input channel, digitizes the sample as a self-clocking phase-encoded digital data word, and transmits the digital data word to the central station over the wide band transmission link. When the controller senses the arrival of data words from a first channel in all of the transceiver units, it sends out a second interrogation pulse to sample a second channel in all of the transceiver units, and so on, until all of the input channels in all transceiver units have been sampled. The interval between successive interrogation pulses to the same channel is typically one-half of one millisecond.

BRIEF DESCRIPTION OF THE DRAWINGS

Other objects, features, aspects and advantages of the invention will become apparent from the following detailed description, appended claims, and from the drawings, in which:

DETAILED DESCRIPTION OF THE INVENTION

Figure 1:
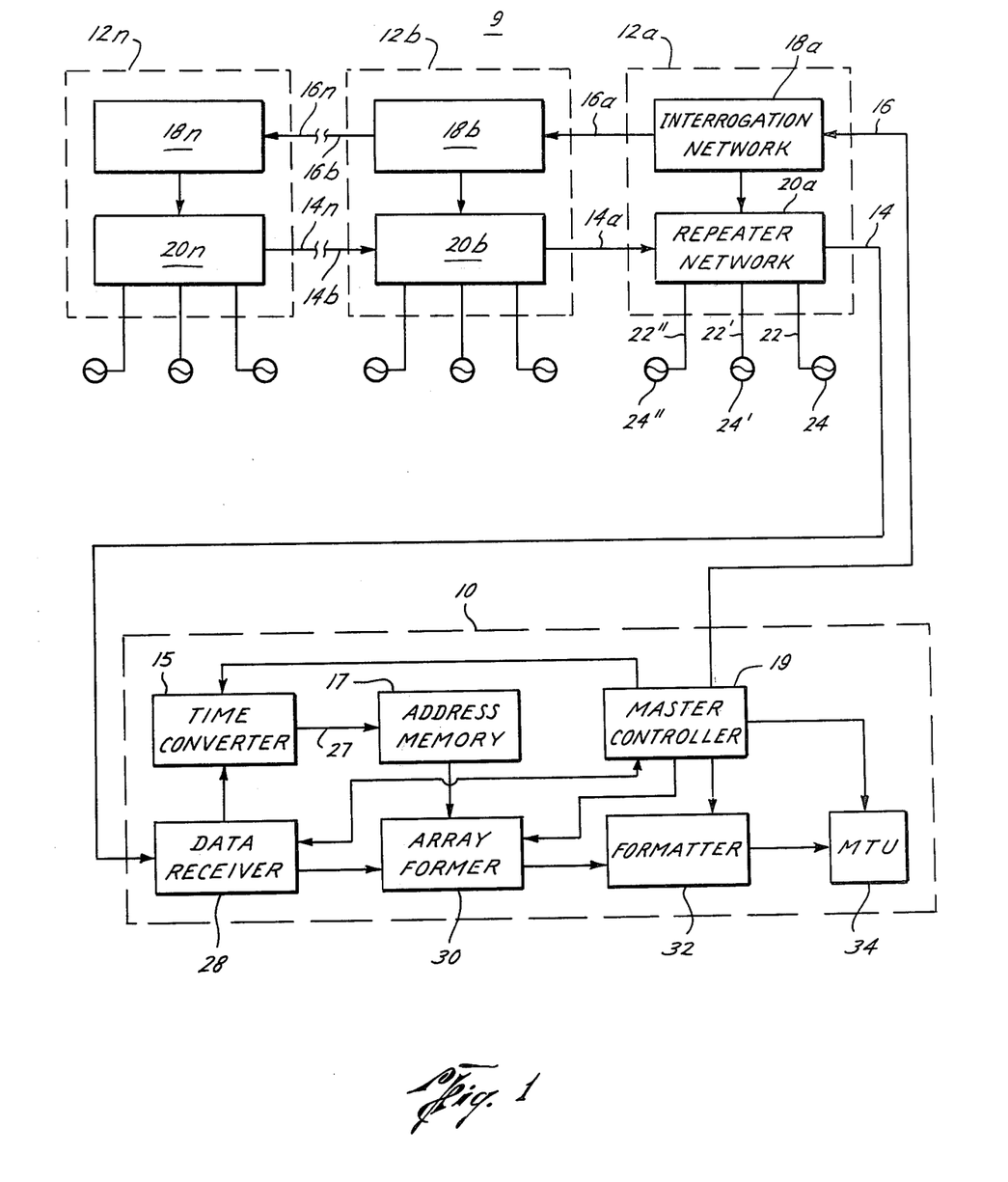
FIG. 1 is a block diagram representation of the telemetry system of this invention.

FIG. 1 is a block diagram representation of the multi-channel seismic telemetering system and array former generally shown as 9. The system comprises a central station 10 and a plurality of transceiver units 12a-n, spaced-apart remotely from central station 10. Transceiver units 12a-n are connected in series to central station 10 through wide-band data transmission links 14a-n and interrogation links 16a-n, contained within a seismic streamer cable section (not shown) such as described in U.S. patent application Ser. No. 664,618. Each transceiver unit 12 includes an interrogation network 18 and a repeater 20. Repeater 20 includes a number of input channels 22, 22', 22". Three such channels are shown for simplicity but fourteen or more may be used in practice. Elemental seismic sensor units 24, 24', 24" are coupled to input channels 22, 22', 22". The elemental seismic sensor units, which constitute separate signal sources, are linearly distributed within the cable section. Up to ten or more such sensor units may be employed in each cable section. There may be 50 or more such cable sections included within the telemeter system. Accordingly there may be 500 or more individual elemental seismic sensor units, each constituting a separate channel of information.

Figure 2:
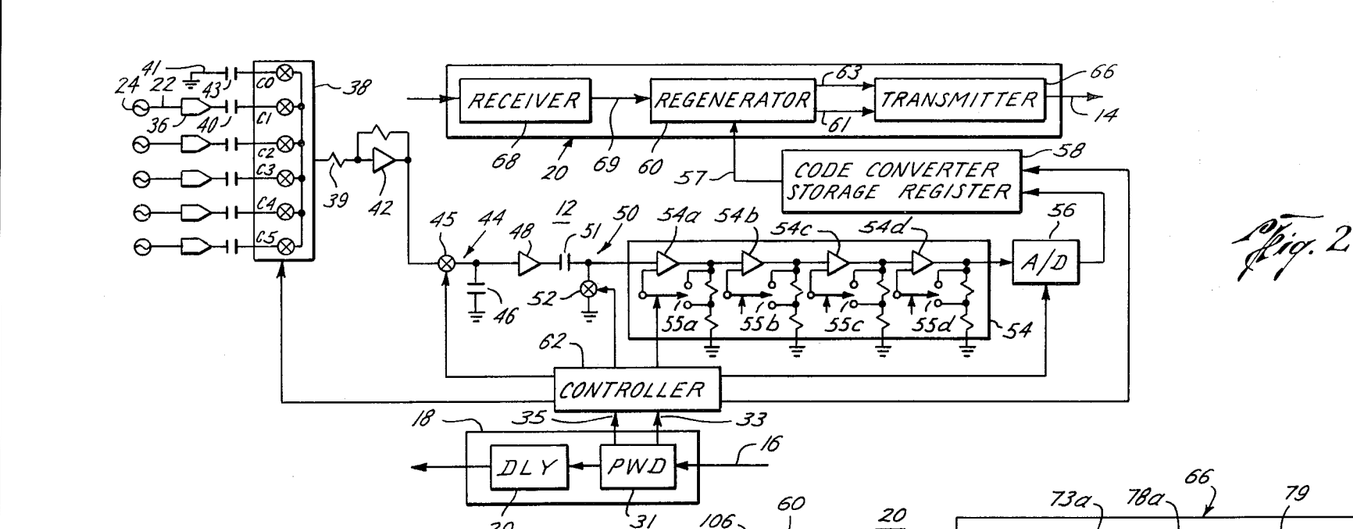
FIG. 2 is a schematic representation of the electronics contained in a single transceiver unit in the telemetry system shown in FIG. 1.

Referring now to FIG. 2 wherein a transceiver unit 12 is shown in greater detail, each analog channel 22 is connected to a separate pre-amplifier and alias filter 36 which is coupled to an input terminal of a multiplexer 38 through a DC blocking capacitor 40. Multiplexer 38 has an input terminal C1-5 (five channels are shown but 14 or more may be used) for each channel 22. Channel CO is a test channel. Channel CO includes a capacitor 43 connected to ground. The multiplexer's output is connected through a common series resistor 39 to an operational amplifier 42. Capacitors 40, multiplexer 38, and common series resistor 39 form a multiplexer-commutated, high-pass RC filter for each channel which is described in greater detail in said copending application Ser. No. 664,614 now U.S. Pat. No. 4,031,506.

The output amplifier 42 is applied to a sample-and-hold circuit 44 which includes a series switch 45 and a shunt capacitor 46. The output of sample and hold circuit 44 is connected to another sample and hold circuit 50 through a buffer amplifier 48. The buffer amplifier 48 provides electrical isolation between the two circuits 44 and 50. The sample and hold circuit 50 includes a series capacitor 51 and a shunt switch 52 connected to ground. The output of circuit 50 is coupled to a binary-gain-ranging amplifier 54. The test channel 41 in conjunction with the sample and hold circuit 50 constitutes a DC offset removal network which is described in greater detail in said copending application Ser. No. 664,615 now U.S. Pat. No. 4,005,273.

The binary gain ranging amplifier 54 comprises four, bigain amplifiers $54_{a-d}$ connected in cascade. Each amplifier normally gas a low-gain state such as unity gain. The feedback can be adjusted to obtain a discrete high-gain state for each amplifier by switches $55_{a-d}$. The binary gain ranging amplifier 54 is described in greater detail in said copending patent application Ser. No. 664,616 now U.S. Pat. No. 4,031,504.

The output of the binary-gain-ranging-amplifier 54 is applied to an analog-to-digital converter 56. Analog-to-digital converter 56 accepts a gain-conditioned analog signal sample and converts it to a binary number in a non-return-to-zero pulse code. The output of converter 56 is fed to a temporary storage register and code converter 58. Code converter 58 converts the binary number from the non-return-to-zero pulse code to a self-clocking phase-encoded pulse code suitable for transmission to transmission link 14 through line 57, regenerator 60 and transmitter 66.

The timing functions of the various networks in each transceiver unit 12 are controlled by a controller 62 which receives an interrogation pulse from an interrogation network 18 in series with the interrogation link 16. A master controller 19 in the central station 10 transmits over link 16 a wide pulse herein designated S1, followed by a number of narrow pulses, designated S2, within each scan cycle of the transceiver unit 12. Assuming thirteen input channels and one test channel, one scan cycle requires transmission of one S1 pulse followed by thirteen S2 pulses. One complete scan cycle for the entire cable may be accomplished within 1 millisecond (thousandth of a second) or less.

The interrogation network 18 consists of pulse width detector 31 and of a delay line 29. When pulse width detector 31 detects a wide S1 pulse, it sends a control SYNC pulse over line 35 to controller 62 to cause it to reset multiplexer 38 to channel $C_O$ thereby initiating DC offset removal and the transmission of a phase-encoded data word from the last channel of the previous scan. When pulse detector 31 detects a narrow S2 pulse it sends a STB pulse over line 33 to cause controller 62 to advance multiplexer 38 to the next channel and to transmit the data from the previous channel. The S1 and S2 pulses propagate through delay line 29 to provide sufficient time delay to allow separation between the end of a local data word as from transceiver unit 12a and the beginning of the data word arriving from the next down-link transceiver unit such as 12b. A gap between data words from the respective transceiver units is required in order to distinguish therebetween.

In the preferred embodiment, a phase-encoded data word is 1000 nanoseconds (billionths of a second) long. Lines 16a and 14a (FIG. 1) are each 200 feet long and the velocity of propagation over these lines is 1.6 nanoseconds/foot. Lines 14a and 16a, therefore, require a pulse travel time of (400 feet × 1.6 nanoseconds/foot) = 640 nanoseconds. The desired gap or dead space between consecutive data words is about one fourth the word length or 250 nanoseconds. Hence, the delay line 29 (FIG. 2) is adjusted for a delay time given by $$D = L + S - T,$$

where $L$ is the length of the phase encoded data word, $S$ is the desired word separation and $T$ is the sum of the travel times of a pulse through lines 14a and 16a. As a numerical example, the artificial delay D is $$D = (1000 + 250 - 640) = 610 \text{ nanoseconds.}$$

The operation of polling each transceiver unit through the interrogation link 16, is described in greater detail in copending application Ser. No. 576,943 now U.S. Pat. No. 3,996,553, assigned to the same assignee.

Figure 6:
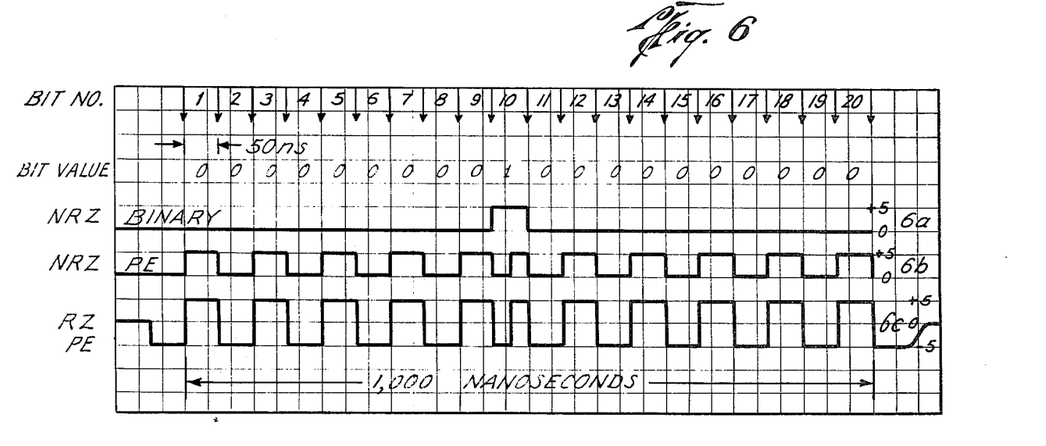
FIG. 6 illustrates different pulse codes as used in this invention.

A data word consists of 20 bits of which bits 1 to 3 are the preamble, bit 4 is parity, bits 5–8 are the exponents, bit 9 is the sign bit and bits 10–20 are the mantissa. From A/D converter 56, the data formatted in binary NRZ (non return to zero) code. This code is illustrated in diagram 6a. One bit interval is 50 nanoseconds. Since there are 20 bits, the word length is 1000 nanoseconds. In this example, bit 9 is a ONE-bit; the remainder are ZERO's.

In code converter 58, the data are formatted in the phase-encoded NRZ pulse code, illustrated in diagram 6b. For a ZERO bit there is one logic-level transition at each bit-interval boundary. For a ONE bit (such as bit 9), there is a mid-interval logic-level transition. In the absence of data, as between data words, the signal level remains at zero. The leading edge of the first bit of a data word must always be a positive-going pulse.

Phase-encoded NRZ data (diagram 6c) are converted to a phase-encoded RZ (return to zero) pulse code by transmitter 66 for constant current mode transmission into data link 14. No-data is represented by a zero logic level. Fifty nanoseconds before the beginning of a data word, the logic level drops to −5V for one bit interval, thereby insuring a positive-going leading edge for the first data bit. There must be one polarity transition, from −V to +V (or +V to −V) at every bit-interval boundary for a ZERO-bit. In addition, a ONE-bit requires a mid-interval polarity change (bit 9 for example). At the end of a data word, the logic level drops to −V for 75 nanoseconds and then goes to zero.

From diagrams 6b and 6c, it is clear that there must be at least one positive-going pulse within any two bit intervals. For a more complete description of various pulse codes, consult "The Interface Handbook" by Kenneth M. True, published by Fairchild Semiconductors Inc., of Mountainview, California, pages 4-15 to 4-22.

In this invention, it is essential that a self clocking pulse code, such as just described, be used because the clocks 108, in each transceiver unit, (FIG. 3) although operating at substantially identical frequencies, are asynchronous relative to each other. In the absence of a self-clocking pulse code, separate timing pulses would necessarily accompany the data word, thereby increasing the system complexity.

Data arriving at a transceiver unit 12b (FIG. 1) from a down-link transceiver unit 12n, will be received by data receiver 68 (FIG. 2) in repeater 20. A regenerator 60 selectively receives either a local data word from storage register and code converter 58 or a down-link data word from receiver 68. The regenerated word is applied over line 63 to a data transmitter 66 for transmission over data link 14 to the next up-link transceiver unit 12a.

Figure 3:
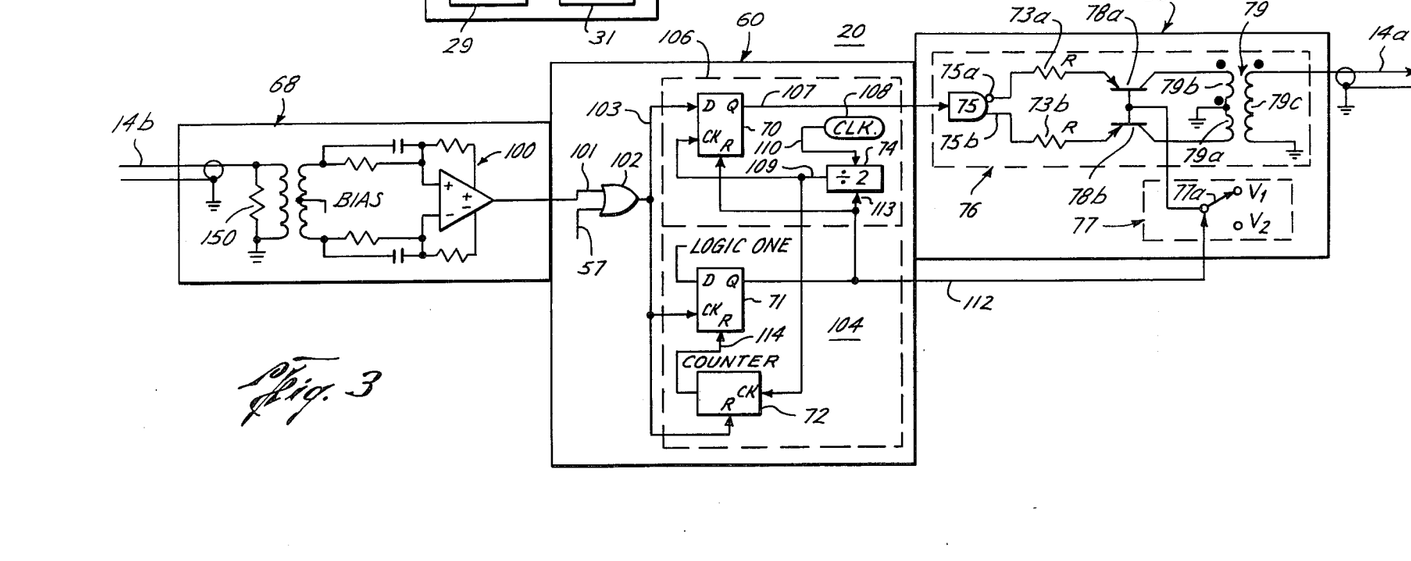
FIG. 3 is a detailed schematic representation of the repeater network in the transceiver unit shown in FIG. 2.

Referring now to FIG. 3, repeater 20 is shown in greater detail. Receiver 68 is a linear amplifier 100 having positive feedback to create hysteresis. Amplifier 100 amplifies incoming phase-encoded RZ data, received over data link 14 and because of the hysteresis converts it to suitable phase-encoded NRZ logic levels. Regenerator 60 includes OR-gate 102 which outputs to line 103, either data from receiver 100 or local data from line 57 connected to the output of storage register 58 (FIG. 2).

A data detector circuit 104 detects a zero crossing, more specifically the negative to positive transition at the first bit-interval boundaries, to enable a data synchronizer 106. The data detector 104 also detects the absence of data, such as the gap between data words, when no polarity transitions occur at the output of OR-gate 102 within a specified time interval. Thus, line 101 receives only down-link data words, while line 103 receives either local or down-link data words.

Each transceiver unit 12 has a precise 80 MHz (Megahertz) crystal oscillator or clock. The clocks in the respective transceiver units are free-running and asynchronous with one another. Because of noise contamination and high-frequency degradation through data transmission link 14, the phase-encoded data words may become distorted. Furthermore, because of line losses, signal levels become attenuated. Accordingly, it is necessary to amplify and regenerate the data pulses at each transceiver unit 12. But in order to regenerate the data pulses at each transceiver unit, they must first be resynchronized with the local clock.

Local clock 108 (FIG. 3) synchronizes phase-encoded NRZ data words in data synchronizer 106. Line 107 receives resynchronized data which is sent to transmitter 66 under the control of a control pulse from line 112 connected to data detector 104. Line 113 from data detector 104 also sends control pulses to data synchronizer 106.

The regenerator and synchronizer network 60 consists of flip-flops 70, 71, a counter 72, a crystal oscillator (clock) 108 and a divide-by-two module 74. Initially, flip-flop 71 is reset, setting its Q output to ZERO, thereby resetting the Q output of flip-flop 70 to ZERO. Divider 74 is also reset so that no clock pulses are transmitted over line 109 to counter 72. When the first bit of a data word is received over line 103, the first data pulse on line 103 will be a positive-going pulse, rising from ZERO to ONE. This positive going pulse will clock the Q output of flip-flop 71 to a ONE, thereby releasing, through line 113, flip-flop 70 and divider 74. Divider 74 will transmit a 40 MHz clock pulse over line 109. The clock pulse that is most nearly in phase with the positive-going data pulse on line 103, will trigger flip-flop 70 to transfer the logic-one at the D input to the Q output as a regenerated, resynchronized data pulse.

Data detector 104 includes a counter 72 to test for the presence of a data word on line 103. The first positive-going pulse of a data word on line 103 resets counter 72. The clock line 109 sends a gated 40 MHz clock pulse to counter 72. The counter counts three clock pulses. Since the pulses occur every 25 nanoseconds, the three counts occupy 75 nanoseconds, 25 nanoseconds more than one bit-interval. If the counter is not reset by a positive going data pulse within the 75-nanosecond interval, counter 72 will time out after three pulses. When counter 72 times out, it sends a reset pulse over line 114 to reset flip-flop 71, causing line 113 to go to ZERO, thereby resetting flip-flop 70, divider 74 and disabling transmitter 66 via line 112.

Figure 4:
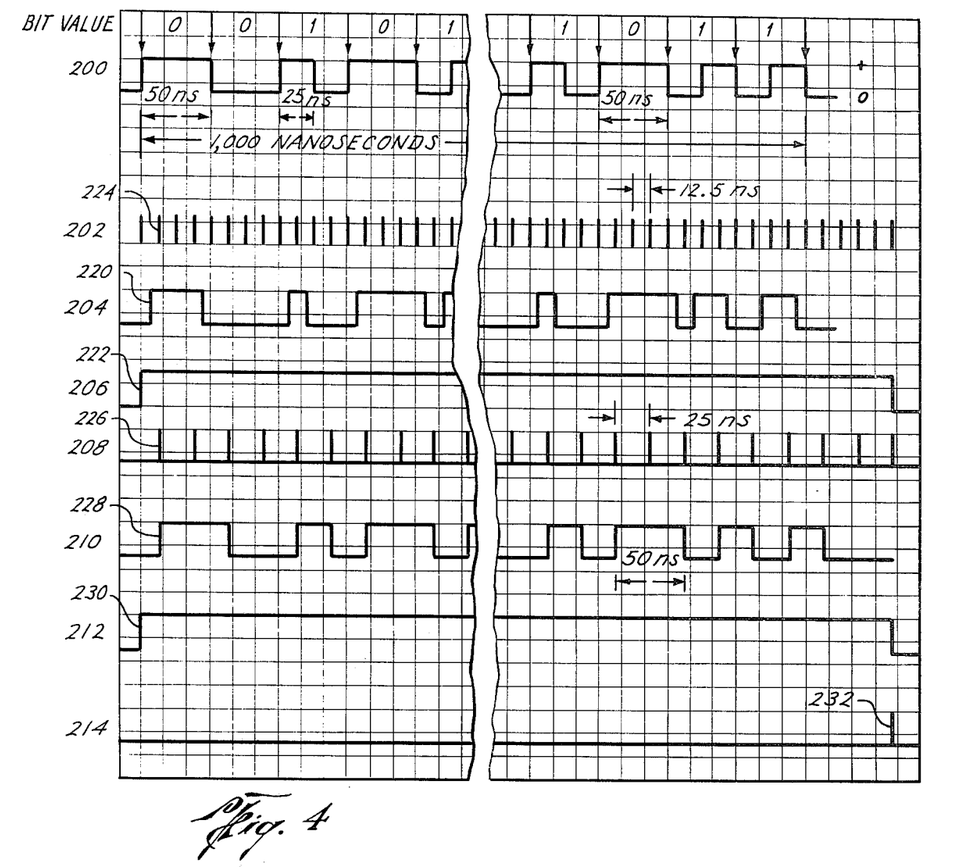
FIG. 4 shows timing diagrams useful in explaining the operation of the telemetry system shown in FIG. 1.

FIG. 4 is a set of timing diagrams illustrative of the operation of regenerator 60. The first diagram 200 illustrates binary data formatted as a phase-encoded NRZ data word. The bit-interval is 50-nanoseconds. For a ZERO bit, there is no polarity reversal between the bit-interval boundaries; for a ONE bit the polarity changes at mid-interval. A polarity reversal must occur at each bit interval boundary. The bit-interval boundaries are indicated by arrows above the diagram. The bit values are written between the arrows. A complete data word consists of 20 bit-intervals and is therefore, 1000 nanoseconds long. From the diagram, it is seen that there must be at least one positive-going pulse within any two bit-intervals. It is upon this feature that the operation of data detector 104 depends as discussed above.

The second diagram 202 represents a train of 80 MHz clock pulses 224. Diagram 204 shows the wave form of an incoming data word that has been translated by receiver 68 from phase-encoded RZ pulse code to phase-encoded NRZ pulse code. Due to noise and distortion effects, the original pulses illustrated in line 200 have deteriorated. The received pulses are out of phase and unsymmetrical.

Referring now to FIG. 3 and 4, the first positive-going transition 220 of the data word clocks the Q output of flip-flop 71 to a ONE. The logic ONE on line 113 creates an enable signal 222 to divider 74 and flip-flop 70 (timing diagram 206). The next 80 MHz clock pulse 224 which is most nearly in phase with rising bit-edge 220, will become the first 40 MHz clock pulse 226 (timing diagram 208). Clock pulse 226 clocks the logic ONE at the D input of flip-flop 70 to the Q output through line 107 as the leading edge 228 of the first resynchronized, regenerated data bit. So long as a logic ONE is present on lines 112 and 113 a transmit-enable signal 230 (timing diagram 212) enables output transmitter 66. The data bits on line 107 can than be converted from phase-encoded NRZ data to phase-encoded RZ data for transmission to the next up-link transceiver unit. Once the first rising bit edge has been resynchronized, the 40 MHz clock pulses will resynchronize and regenerate the remaining data bits. Timing diagram 214 illustrates the output through line 114 from counter 72. When a data word remains zero for three 40-MHz clock pulses, counter 72 will send out a pulse 232 to reset flip-flop 71, counter 74, and to disable transmitter 66.

Transmitter 66, FIG. 3, includes a voltage to bipolar current converter 76 and an NRZ to RZ converter 77. To reliably send data over a transmission link such as a coaxial cable the signals should be AC in nature with no low-frequency components. In a preferred embodiment, constant current mode transmission is utilized to avoid the necessity for using wide dynamic-range receivers for item 68. Voltage losses per unit length of the data link 14 cause severe signal attenuation. Constant current mode transmission will provide substantially constant voltage levels at the terminating resistor 150 at the input of receiver 68 regardless of losses in data link 14 between adjacent transceivers.

To provide constant current mode transmission, the phase-encoded data words are converted from a voltage to a constant current by current converter 76. Voltage logic gate 75 includes both inverting and non-inverting outputs 75a and 75b. Resistors 73a, b (which have the same value R) and transistors 78a, b, convert the voltage levels of logic gate 75 to constant currents. The bases of transistors 78 are set at voltage $V_1$, $V_1$ being equal to the ZERO state of logic-gate outputs 75a and b. The exact voltage of the ZERO state depends upon the type of logic selected. The voltages $V_R$ appearing across resistors 73a, b will be respectively, output voltage states $(V_a - V_1)$ and $(V_b - V_1)$. Therefore the current through the two resistors will be respectively $$I_{high} = (V_R, \text{ONE state} - V_1)/R,$$

or $$I_{low} = (V_R, \text{ZERO state} - V_1)/R = 0.$$

The output current in data link 14 will therefore be equal to $$Ia_{high} - Ib_{low},$$

which changes to $$-Ib_{high} + Ia_{low}$$

for a bit-interval polarity transition (refer to FIG. 6). Since $Ia_{low}$ and $Ib_{low}$ are zero, the current in data transmission link 14 will be $Ia_{high}$, switching to $-Ib_{high}$ at a bit-polarity transition. These data are in bi-polar, NRZ current mode. At the end of a data word a low frequency component would result, because of the time constants of transformer 79 and coaxial data link 14. To prevent the low frequency component, the NRZ signal is converted to RZ by the action of circuit 77. When the transmitter is enabled by a pulse through line 112, switch 77a is connected to voltage $V_1$. For simplicity, the switch 77a is shown as a mechanical switch however in actual practice it is replaced with a solid state switch such as a transitor or FET. When the end of a data word has been sensed by data detector 104, FIG. 3, a pulse through control line 112 connected to data detector 104 will cause switch 77a to switch to $V_2$. $V_2$ is equal to the ONE state of 75a, b thus turning off transistors 78a and 78b. The current in transmission link 14 will go to zero thus converting the bipolar NRZ output of transformer 79 to bi-polar phase-encoded RZ pulse code. Windings 79a, b, c, have a 1:1:1 turns ratio.

Figure 5:
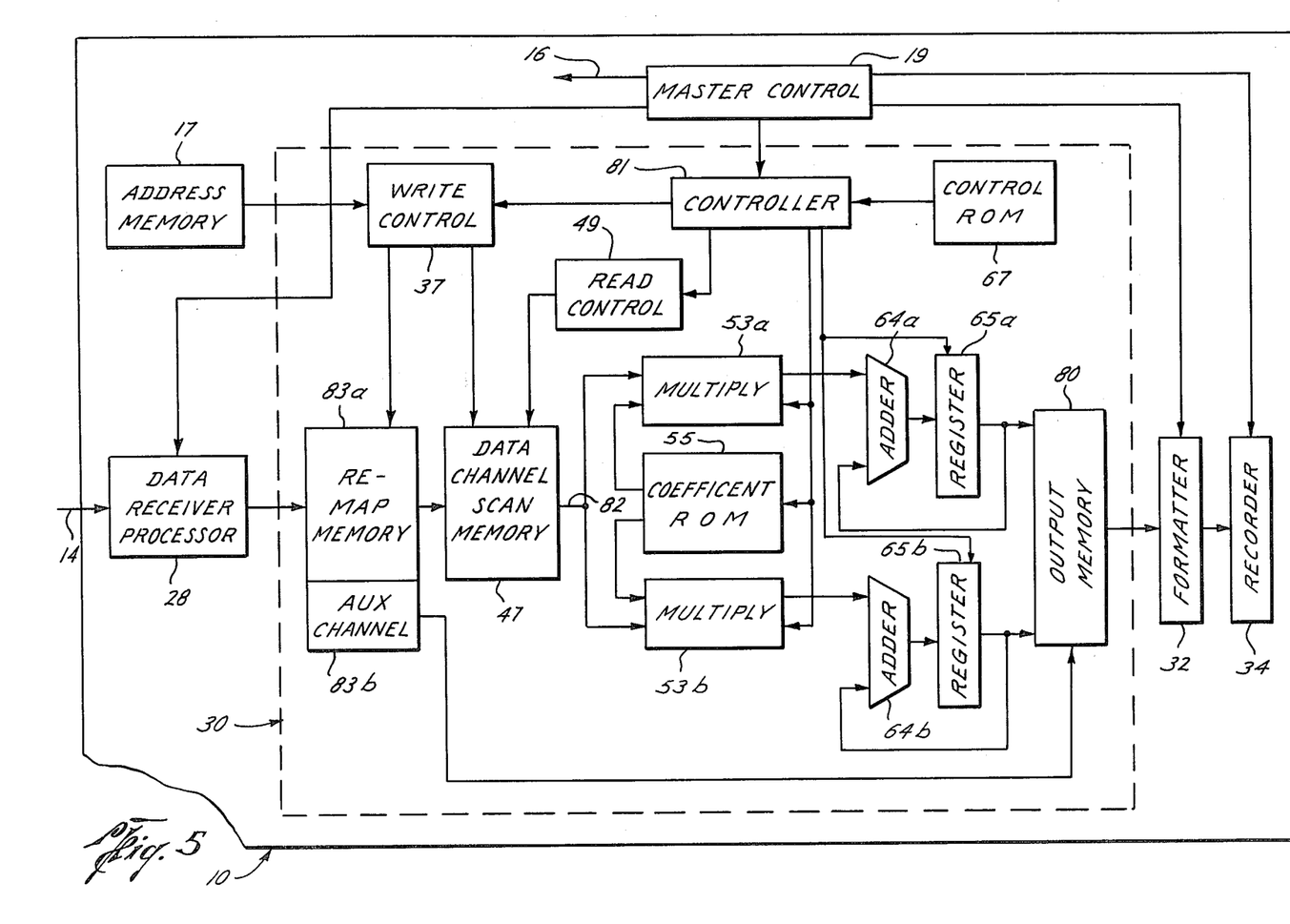
FIG. 5 shows a schematic representation of an array former as contained in the central station of FIG. 1.

Referring now to FIGS. 1 and 5, central station 10 includes a data receiver 28 which receives the phase encoded RZ data words telemetered from the transceiver units 12 over data transmission link 14. Data receiver 28 translates the phase encoded RZ data words to a binary NRZ pulse code first as floating point numbers, and then it reconverts from floating to fixed-point numbers representing data words. The fixed-point data words are arranged in a channel-sequential matrix in a re-map memory in array former 30 as will be discussed later. Each elemental seismic sensor unit 24 constitutes a subarray. The output signals from a number of subarrays are combined in array former 30 to synthesize a new composite signal characteristic of a much larger extended array. The synthesized composite signal is transferred to a formatter 32 and thence to a magnetic tape unit 34 where the signals are recorded for later use in providing a seismic cross section of the earth.

At the beginning of a seismic operation, a calibrate-address mode is initiated at central station 10. An interrogation pulse is sent from master control 19 through interrogation link 16 to the respective transceiver units 12. As each transceiver unit 12 detects the interrogation pulse, a data word is sent back to receiver 28 over data link 14. A time converter 15 measures the time between transmission of the calibrate interrogation pulse and the arrival of the resulting data words from the transceiver units 12. There is of course, a unique time delay associated with the data words from each transceiver unit. The time delays are encoded as binary numbers to form an address code and are stored through line 27 in address memory 17. During a normal operation, time counter 15 times the interval between respective interrogation pulses and the returning phase-encoded data words. The time intervals are compared with the stored address codes. Address memory 17 then identifies each received data words as to the transceiver unit of origin and causes array former 30 to place the received data word in the proper location in the matrix in a core memory.

FIG. 5 shows a schematic representation of the array former 30. The array former 30 includes controller 81, re-map memory 83a, b, memory write control 37, data channel scan memory 47, read control 49, multiplier 53a and 53b, coefficient read only memory 55, adder 64a and 64b, accumulator registers 65a and 65b, output memory 80, and read only control memory (ROM) 67.

As noted earlier, receiver 28 receives the phase-encoded data words from the down link transceiver 12a–n and converts the RZ phase-encoded return-to-zero data words into NRZ binary floating point numbers which are reformatted to fixed point numbers. Simultaneously upon the receipt of the data words, time counter 15 and memory address 17 identifies each one as to their origin in terms of transceiver-unit number and data-channel number. The fixed point numbers from receiver 28 are transmitted to array former 30 and stored in re-map memory 83, where they are written in data-channel sequence under control of controller 81 and write control 37, after data channel identification by address memory 17.

The data channels are numbered from 1 to 500 starting with the first elemental seismic sensor unit in the nearest down-link transceiver 12a and ending with last seismic sensor in the most remote down-link transceiver 12n. The phase-encoded data words, however, are not received in numerical sequence from the data link 14. They arrive as previously described as transceiver channel 1 from all the transceivers 12a–n, then transceiver channel 2 from all transceivers 12a–n, etc. In data channel numbering, channel 1 of transceiver 12a becomes channel 1 in the re-map memory matrix; transceiver 12b, channel 1, becomes data channel 11; transceiver 12c, channel 1, becomes data channel 21; and transceiver 12n, channel 1, becomes data channel 1 + 10n. Transceiver channels 0, 11, 12, 13, are normally auxiliary channels.

The function, therefore, of the re-map memory 83a is to assemble the incoming, fixed-point data from receiver 28 into the correct data-channel sequence in a memory matrix and to separate the auxiliary channels into their correct sequence in an auxiliary channel memory location 83b. When one scan of seismic data and auxiliary channel data has been written in re-map memory 83a, b the data-channel signals from re-map memory 83a are written into data-channel scan memory 47 and the auxiliary channel data 83b is written into output memory 80.

As stated previously, the digital numbers stored in re-map memory 83a represent the signals from the 500 individual elemental seismic sensor units, each one of which constitutes a short subarray. Control ROM 67 and coefficient ROM 55 are preprogrammed to combine the digital signals from selected subarrays in order to synthesize a composite digital signal characteristic of a much larger desired array. The weight, or contribution that the digital signal of an individual subarray makes to the total composite digital signal is controlled by the coefficient ROM 55. The methods and techniques for applying weighting coefficients are described more fully in U.S. patent application Ser. No. 665,150.

The seismic data-channel signal in scan data channel memory 47 are read out in data-channel sequence, data channel 1 being first and data channel $n \times 10$ being last. The data channel signals are transmitted over data bus 82 to multipliers 53a and 53b. Under control of controller 80 and the programmed array pattern that is stored in control ROM 67, each data channel signal is multiplied by the appropriate weighting coefficient stored in coefficient ROM 55. If the signal from a data channel is not to be used in an array, its coefficient will be zero and hence the result of the multiplier will be zero. The weighted data-channel signals are then algebraically added in adders 64a and 64b to the outputs of registers 65a and 65b. The accumulated results in registers 65a and 65b will be the sum of weighted data channel signals. Controller 81 in response to ROM 67 will transfer the contents of registers 65a and 65b into output register 80 as one data sample for each composite array when the previously-programmed number of individual data-channel signals forming each composite array has been summed. The process will continue until all the data channels in scan data channel memory 47 have been processed into composite array signal samples and transferred to output memory 80. The contents of output memory 80 will then contain one scan of composite signal samples for the composite arrays. Auxiliary channel data are similarly formatted under control of controller 81.

By way of example but not by way of limitation, assume a seismic cable assembly having 500 individual short subarrays. The output signals from consecutive groups of 20 subarrays could be combined to produce composite signals representative of 25 much longer arrays. By use of dual multipliers 53a, b, dual adders 64a, b and dual registers 65a, b, some of the signals from some of the 20 subarrays making up each of the consecutive array grouping can be combined with adjacent groupings to create composite signals representative of 50 overlapping, longer arrays.

The contents of output memory 80 will be sequentially transferred to formatter 32 and then to recorder 34. As this cycle of processing is being completed for the first scan, the next scan of new data is being re-mapped in memory 83a and 83b. At the completion of processing of the first scan, as determined by controller 81, the new data are transferred to scan data control memory 47 where the processing commences for forming a second scan of signal samples for the next composite array.

The process recited above continues until the recording and processing cycle is complete as determined by preset controls in master controller 18.

In summary, the operation of the system is as follows: A number of transceiver units 12 are disposed at regular intervals remotely with respect to a central station 10. Each transceiver unit has 14 input channels to which are connected seismic sensor subarrays as well as a channel selector (multiplexer) and common signal conditioning electronics. Of the 14 channels, ten are data channels. The remainder are test and auxiliary channels. The output of the common signal conditioning electronics is connected to a repeater network 20. Internal to the transceiver units is an interrogation network 18.

The repeater networks of the respective transceiver units are connected in series to a data receiver 28 in central station 10 through a wide-band transmission link 14. The interrogation networks are in turn interconnected with a master controller 19 in central station 10 by an interrogation link 16.

Periodically at the beginning of each scan interval, such as every millisecond, master controller 19 sends an S1 (wide) interrogation pulse through interrogation link 16. As the interrogation network 18 in each transceiver unit 12 identifies the S1 pulse, the channel selector is reset. The digital data word from the last channel of the previous scan is converted to a self-clocking phase-encoded, RZ data word and is applied, by a transmitter 66, to transmission link 14 for transmission to data receiver 28 in central station 10. An S2 pulse is transmitted from controller 19, 71.4 microseconds later. As each transceiver unit receives and identifies an S2 pulse, the channel selector is advanced to channel 1. The seismic signal present in channel 1 is sampled, conditioned, and digitized as a phase-encoded NRZ digital word as a "local data word". The local data word is converted to a phase-encoded RZ data word and is applied to transmission link 14.

Each transceiver unit first transmits a local data word. It then awaits the arrival of a remote data word from the next down-link transceiver unit. The remote data word is received, regenerated and retransmitted up-link to data receiver 28 in central station 10. Thus, transceiver unit 12a transmits its local data word and then receives, regenerates and retransmits remote data words from the other 49 transceiver units (assuming that there are 50 transceiver units in all). The last, 50th transceiver unit, of course, transmits only its own local data.

During one scan cycle, in order to sample all channels in all transceiver units, one S1 pulse and thirteen S2 pulses must be transmitted within a sample interval. Thus, data words are transmitted to data receiver 28 in a time-sequential/channel sequential multiplexing cycle. That is, data words from the respective transceiver units 12a–n are separated in accordance with the interrogation pulse travel time between consecutive transceivers. An artificial delay is inserted in each interrogation network to insure separation. Data words from the respective channels within each transceiver unit are separated in accordance with the channel-select sequence.

As the data words arrive at data receiver 28, they are directed to a re-map memory where they are ordered in a channel-sequential matrix. The first data channel of the first transceiver unit 12a is channel 1. The last data channel of the last transceiver unit 12n is channel 500. Thus, in response to the first interrogation pulse, data words from data channel 1, 11, 21, etc. are received; in response to the second interrogation pulse, data words for channels 2, 12, 22, etc. are received and so on.

In central station 10, a control ROM is preprogrammed to extract signal samples originating from selected groups of seismic subarrays from re-map memory 83a. The selected signal samples are transferred to data channel scan memory 47. From memory 47, the signal samples are transferred to multipliers 53a, b where they are multiplied by selected weighting coefficients under control of coefficient ROM 55. The weighted samples are then composited in adders 64a, b as a single composited signal sample representative of a much larger array having preselected properties. The composited data are stored in output memory 80 for subsequent transfer to formatter 32 and ultimate recordation in a recorder 34, such as a magnetic tape.

In summary, this invention provides a single seismic cable which will permit the formation of any desired seismic sensor array configuration from a plurality of subarrays. It is not necessary to physically change the seismic cable or other data acquisition system components in the field, in order to provide different arrays to cope with changing geological conditions.

What is claimed as novel is:

1. In a seismic data system comprising a central station; a plurality of remote transceivers, each having a plurality of input channels; a broadband transmission link including an interrogation channel connecting said transceivers in series to said central station; means in each said transceiver, coupled to said interrogation channel for applying a fixed delay to said interrogation signals, for regenerating said interrogation signals, and for transmitting said interrogation signals down-link to the next-in-series transceiver, the fixed delay being less than the sum of the digital-data-word length plus the two-way signal propagation delay through the interrogation channel; a plurality of spaced elemental seismic sensor units connected to supply analog seismic signals to corresponding input channels in each said transceiver; means in each said transceiver for sampling input seismic signals and for converting the amplitudes and polarities thereof into multibit, self-clocking, floating-point, phase encoded digital data words having a predetermined length in time, the respective bit values being defined by coded phase reversals, each said digital data word being divided into a number of bit intervals having a width equal to an integral submultiple of the digital data word length; control means in each said transceiver coupled to said interrogation channel for applying digital data words from each channel of each said transceiver to said broadband transmission link, in constant current mode, in response to interrogation signals received from said central station over said interrogation channel, the improvement wherein:

the leading edge of the leading bit of each said data word always has the same given polarity trend, the improvement further including:

first means in each said transceiver for receiving digital data words from respective down-link transceivers, and for regenerating and retransmitting said digital data words up-link;

second means in said central station for receiving digital data words from said respective transceivers; and sensing means included in said first means and said second means for sensing said given polarity trend as the beginning of a digital data word and means for detecting the end of a digital data word by counting the number of phase reversals in the direction of said given polarity trend that occur within a prescribed multiple of the bit interval.

2. The system as defined in claim 1 including:

means coupled to said second means and to said interrogation channel for measuring the elapsed time interval between the time of transmission of an interrogation signal over said interrogation channel and the time of receipt of the respective digital data words from said transceivers;

means in said central station for converting said elapsed time intervals to corresponding binary address words; and means for storing the resultant binary address words associated with said received digital data words for source identification.

3. In a seismic data aquisition system including a central station, having a master controller, a plurality of remote transceivers each having a plurality of input channels, a broadband data transmission link and interrogation link connecting said transceivers in series to said central station, a plurality of elemental seismic sensor units connected to supply analog seismic signals to corresponding input channels in each said transceiver, means in each said transceiver for sampling input seismic signals and for converting the amplitudes and polarities thereof to multibit, self-clocking, floating-point, phase-encoded digital data words, control means in each said transceiver for applying the digital data words from each said transceiver to said data transmission link in transceiver-sequential, channel-sequential order, in response to interrogation signals received from said master controller in said central station over said interrogation link, the improvement comprising:

data receiver means in said central station coupled to said master controller, for measuring the elapsed time interval between the time of application of an interrogation signal to said interrogation link and the time of receipt of the respective digital data words from said transceivers;

means for converting each of said elapsed time intervals to a corresponding binary address word defining the transceiver from which each said digital data word originated;

remap memory means in said central station coupled to said data receiver means for converting the arrangement of the received digital data words from transceiver-sequential, channel-sequential order to consecutive channel-sequential order in accordance with the respective corresponding binary address words.

means, coupled to said remap memory, for combining digital data words from selected groups of input channels to programmably reconfigure the array response of the associated elemental seismic sensor units; and a weighting coefficient memory for weighting the digital data words as they are being combined.

4. A system as defined in claim 3 wherein said broadband data transmission link is more than one mile in length, has a frequency pass-band of a least 100 MHz, and wherein said control means for applying digital data words to said broadband data transmission link has a pulse repetition rate of more than 20,000,000 pulses per second and includes circuit means for retransmitting said words in return-to-zero pulse code form.

* * * * *